United States Patent [19]

Uhlenhoff

[11] Patent Number: 4,763,297

[45] Date of Patent: Aug. 9, 1988

[54] MONOLITHIC INTEGRATED DIGITAL CIRCUIT INCLUDING AN INTERNAL CLOCK GENERATOR AND CIRCUITRY FOR PROCESSING MULTI-DIGIT SIGNALS

[75] Inventor: Arnold Uhlenhoff, Emmendingen, Fed. Rep. of Germany

[73] Assignee: Deutsche ITT Industries GmbH, Freiburg, Fed. Rep. of Germany

[21] Appl. No.: 860,559

[22] Filed: May 7, 1986

[30] Foreign Application Priority Data

May 7, 1985 [EP] European Pat. Off. ........ 85105578.0

[51] Int. Cl.⁴ .............................................. G06F 1/04
[52] U.S. Cl. ................................................. 364/900
[58] Field of Search ... 364/200 MS File, 900 MS File, 364/784, 785, 736, 749; 307/269; 370/103

[56] References Cited

U.S. PATENT DOCUMENTS

| 4,285,047 | 8/1981 | Ohnishi | 364/785 |
| 4,503,490 | 3/1985 | Thompson | 364/200 |
| 4,613,775 | 9/1986 | Dick | 307/269 X |

FOREIGN PATENT DOCUMENTS

| 58-80724 | 5/1983 | Japan . |
| 58-166419 | 10/1983 | Japan . |
| 58-219625 | 12/1983 | Japan . |

*Primary Examiner*—Raulfe B. Zache
*Assistant Examiner*—Florin Munteanu
*Attorney, Agent, or Firm*—T. L. Peterson

[57] ABSTRACT

A monolithic integrated digital circuit including at least one circuit for the serial data processing of multi-digit data signals synchronized to a clock system, the serial data processing circuits using a clock signal coming from a clock oscillator which is also integrated. The clock oscillator includes an odd number of ring-connected inverting stages. The output of the oscillator is provided to a counter. When the counter counts a number of pulses equal to the number of digits of the output signal of the data processing circuit, the counter stops the clock oscillator. The system clock signal is applied to both the reset input of the counter and the synchronizing input of the data processing circuit.

1 Claim, 1 Drawing Sheet

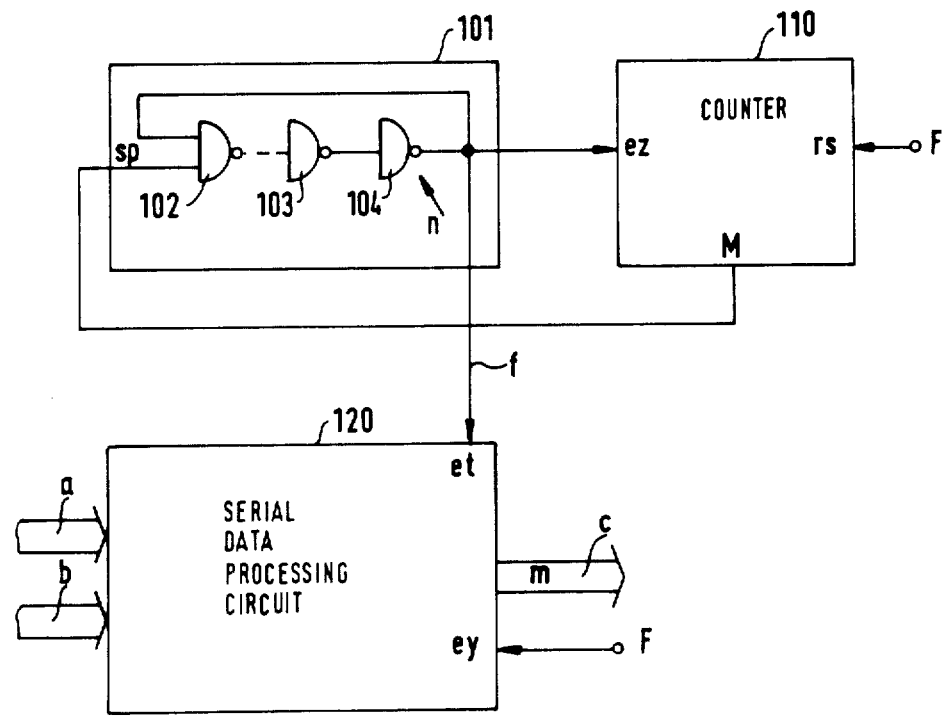

MONOLITHIC INTEGRATED DIGITAL CIRCUIT INCLUDING AN INTERNAL CLOCK GENERATOR AND CIRCUITRY FOR PROCESSING MULTI-DIGIT SIGNALS

BACKGROUND OF THE INVENTION

The invention relates to a monolithic integrated digital circuit comprising at least one data-processing circuit operating on a system clock signal, for multi-digit, data signals which contain very large numbers of digits.

Examples of such types of integrated digital circuits are signal processors and microprocessors which are commercially available. Further examples are integrated digital circuits forming part of a system consisting of several integrated circuits, and containing the corresponding data-processing circuits operating on a system clock signal, which are commercially available. One specific such system comprises several integrated circuits for the digital signal processing in television receivers, as described at pages 97 to 103 of "Electronics", Aug. 11, 1981. One essential feature of such integrated digital circuits is that multi-digit data signals are processed by the data-processing circuits in a parallel operation, that is, the multi-digit data signals are processed during a few clock periods in e.g. parallel adders, parallel multipliers, parallel comparators, etc.

Because parallel processing is used, the investment in crystal surface of the integrated digital circuit is large, so that semiconductor manufacturers will always tend to realize an electronic system which is to be integrated, having a small crystal surface area.

Another aspect of the integration of whole systems is the choice of the most suitable semiconductor integration technique. A determination must be made whether to use bipolar or MOS circuits with their respective specified subgroups, such as e.g. I$^2$L (bipolar) or N-channel, CMOS, etc., especially with a view to the maximum possible processing speeds peculiar to each of these integration techniques. In cases where the system clock frequency is defined on account of the respective system employed, for example, as with the aforementioned digital circuits for television receivers, this extensively determines the investment in crystal surface, because in the unanimous opinion of experts only a parallel processing of the data signals is feasible in the case of such high frequencies.

SUMMARY OF THE INVENTION

The invention, for the purpose of reducing the crystal surface in digital circuits adopts a different method in that it maintains the system clock, but mainly only still uses it for synchronizing the individual data processing circuits, whereas as the actual clock signal for the data processing there is used a clock signal produced internally by a clock oscillator consisting of an odd number of ring-connected inverting stages. In other words, a ring oscillator is used whose frequency depends on the selected integration technique, but makes use of the delaying properties of inverting stages, which are inherent to each of the specific integration techniques.

Accordingly, as development of faster integration techniques further continues, the invention will permit the then possible integrated digital circuits to be adapted automatically to this increase or advance in speed.

The internal clock oscillator, instead of clocking parallel-operating data processing circuits as is customary with the aforementioned prior art, now clocks corresponding serially operating data processing circuits. Instead of parallel adders, parallel mutlipliers, etc., the invention now employs serial adders, serial multiplier, etc.. The processing time, for example, is determined in the case of a serial adder by the full adder as only existing once therein, and is substantially shorter than the period of the system clock signal. Since, moreover, this processing time in the same sense depends on the chosen integration technique, just like the frequency of the clock oscillator which is integrated as well, it is possible for the latter, by selecting the number of ring-connected inverting stages accordingly, to be adapted to the processing time.

BRIEF DESCRIPTION OF THE DRAWING

The invention will be better understood from a reading of the following detailed description in conjunction with the drawing which is a block diagram of one embodiment of the invention.

DETAILED DESCRIPTION

The clock oscillator 101, as an example relating to the number n of odd, ring-connected inverting stages, and in terms of signal flow, shows the series connection of a NAND-gate 102 and of two inverters 103, 104.

The output of inverter 104 is connected to one input of NAND-gate 102, thus completing the ring circuit. The broken connecting line shown extending between NAND-gate 102 and inverter 103 indicates that series arrangements with a different odd number n are possible. The oscillation frequency of the clock oscillator 101 results from the sum of the gate delays of the inverting stages, with the number n being greater than 1, hence at least 3.

The output of the clock oscillator 101 is connected to the counting input ez of counter 110 which thus counts the pulses of the clock signal f. The eutput of clock oscillator 101 is also connected to the clock input et of the serial data processing circuit 120. In the embodiment as shown, two multi-digit digital signals a, b, to be processed are applied to the input side thereof, and the corresponding output signal c is supposed to have the number of digits m. Accordingly, if for example the serial data processing circuit 120 is a serial adder and the digital signals a, b each have five digits, then the output signal c is a six-digit one, so that m=6. Moreover, the serial data processing circuit pc, via its synchronizing input ey, receives the system clock signal F. In this way the data signals a, b and the output signal c can be synchronized with the system clock, which means that in particular the output signal c, is forwarded either to other partial circuits of the integrated digital circuit or to the outside at the same system-clock time positions.

The particular counter-reading output of the counter 110 whose ordinal number M is identical to the number of digits m of the output signal c of the data processing circuit pc, is connected to the stop input sp of the clock oscillator 101. The stop input is the second input of NAND-gate 102. The clock oscillator 101 thus produces m clock pulses and then remains at a standstill until the edge of the next system clock signal F. Of course, the corresponding binary signal level at the output M of the counter 110 will have to be chosen in connection with the NAND-gate and its mode of operation according to the just described functional sequence.

As has already been mentioned hereinbefore, the frequency of the clock signal f of the clock oscillator 101 is stepwisely selectable by selecting the number n. This selection must be made in such a way as to meet, on the one hand, the requirement according to which the product of both the number of digits m and the period t of the clock signal f must be smaller than or equal to the period T of the system clock signal F and, on the other hand, the requirement according to which the period t must be longer than or equal to the processing time v of the digital processing circuit pc, which is required for processing one digit of the data signals; accordingly, when expressed in the form of an equation, this dimensioning rule would read as follows:

$$T/m \geq t \geq v.$$

Compared to systems customarily in use at present in which clock signals are fed to an integrated circuit from an external clock oscillator and distributed within the integrated circuit to the stages to be supplied—which in turn again calls for a corresponding wiring with the associated space requirement, with this wiring being likely to cause radio interference—the invention offers the added great advantage that to individual partial circuits of an integrated circuit, there may be assigned corresponding clock oscillators 101 with counters 110, so that long wirings and the drawbacks thereof may be omitted. This is also advantageous because it provides power splitting of the clock power.

What is claimed is:

1. A monolithic integrated digital circuit comprising:
   a clock oscillator for producing an internal clocking signal, said clock oscillator comprising n ring connected inverting stages, where n is an odd number greater than one, said clock oscillator having a stop input for stopping production of said internal clocking signal and a clock output, said clock output for supplying said internal clocking signal;
   circuit means for processing multidigit data signals, said circuit means including means for receiving said internal clocking signal from said clock output, means for receiving said multidigit data signals in parallel and means for receiving a system clock input, said circuit means for receiving said multidigit data signal in synchronism with said system clock input and for providing multidigit parallel output signals having a number of digits (m) in synchronism with said system clock input;
   a counter having a clock input coupled to said clock output, a reset input for receiving said system clock input and a count output having an ordinal number (M) identical to the number of digits (m) of said output signals, said count output being coupled to said stop input of said clock oscillator; and wherein said internal clocking signal has a frequency (f) fixed by the number n of ring connected inverting stages and the frequency (f) of said internal clocking signal is selected such that the product of said number of digits (m) of said output signals and the period (t) of said internal clocking signal is equal to or less than the period (T) of said system clock input, and said internal clocking signal having a frequency (f) which is further selected such that the period (t) of said internal clocking frequency is greater than or equal to a time interval (v) for said circuit means to process one digit of said multidigit data signals.

* * * * *